US 6,909,994 B2

(12) United States Patent
Johnson et al.

(10) Patent No.: US 6,909,994 B2
(45) Date of Patent: Jun. 21, 2005

(54) METHOD, SYSTEM AND COMPUTER PRODUCT FOR PERFORMING FAILURE MODE AND EFFECTS ANALYSIS THROUGHOUT THE PRODUCT LIFE CYCLE

(75) Inventors: Timothy Lee Johnson, Niskayuna, NY (US); Paul Edward Cuddihy, Ballston Lake, NY (US); Steven Hector Azzaro, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 201 days.

(21) Appl. No.: 10/303,163

(22) Filed: Nov. 25, 2002

(65) Prior Publication Data

US 2004/0225475 A1 Nov. 11, 2004

(51) Int. Cl.[7] .............................................. G06F 11/30
(52) U.S. Cl. ....................................... 702/185; 714/25
(58) Field of Search .......................... 702/185, 182–184, 702/188; 707/1, 3, 102; 714/25, 39, 45, 46

(56) References Cited

U.S. PATENT DOCUMENTS

| 4,766,595 | A  | * | 8/1988  | Gollomp ....................... 714/33 |
| 5,099,436 | A  | * | 3/1992  | McCown et al. ............. 702/82 |
| 5,586,252 | A  |   | 12/1996 | Barnard et al. ............... 714/48 |
| 5,628,007 | A  | * | 5/1997  | Nevarez ..................... 707/102 |
| 6,253,115 | B1 |   | 6/2001  | Martin et al. ................. 700/97 |
| 6,643,801 | B1 | * | 11/2003 | Jammu et al. ................ 714/37 |
| 2002/0052862 | A1 |   | 5/2002  | Scott et al. ................... 707/1 |
| 2002/0059093 | A1 |   | 5/2002  | Barton et al. ................ 705/10 |

* cited by examiner

*Primary Examiner*—Patrick Assouad
*Assistant Examiner*—Edward Raymond
(74) *Attorney, Agent, or Firm*—Fletcher Yoder

(57) ABSTRACT

A method for performing failure mode and effects analysis throughout the product life cycle. The method comprises receiving incident data from a requestor. The incident data includes a requestor product and a requestor fault mode. A shared failure mode and effects analysis database is accessed and searched for an existing entry that includes the incident data. The contents of the existing entry are transmitted to the requestor in response to locating an existing entry.

37 Claims, 5 Drawing Sheets

FIG. 2

| DESIGN TERMINOLOGY (244) | FIELD SERVICE TERMINOLOGY (246) |
|---|---|
| 202 PRODUCT | |
| 204 COMPONENT | |
| 206 FAULT MODE | CUSTOMER COMPLAINT (234) |
| 208 CAUSE | |
| 210 PRIMARY EFFECT | COMPONENT SYMPTOM (236) |
| 212 PRODUCT LEVEL EFFECT | PRODUCT LEVEL SYMPTOM (238) |
| 214 SEVERITY | |
| 216 OCCURRENCE | |
| 218 DETECTABILITY | |
| 220 MAINTAINABILITY | |
| 222 DATA AVAILABILITY | |
| 224 NOTES | |
| 226 MEASUREMENT | TROUBLE SHOOTING PROCEDURE (240) |
| 228 CORRECTIVE ACTION | REPAIR PROCEDURE (OR SOLUTION) (242) |
| 230 DATE | |
| 232 RISK PRIORITIZATION NUMBER | |

FIG. 5

502 —
```
PRODUCT    UPS
FAULT MODE  SHORT CIRCUIT IN CELL
SYMPTOM  NO POWER TO UPS
```

504 — CONSENSUS FMEA

| CAUSE | PRIMARY EFFECT | OCCURRENCE | MEASUREMENT | CORRECTIVE ACTION |
|---|---|---|---|---|
| CAUSE X | LOW VOLTAGE | 5 |  | N/A |
|  | NO CAPACITY | 3 |  | REPLACE CELL |
|  | SHORT CIRCUIT | 3 |  |  |
| ⋮ | ⋮ | ⋮ | ⋮ | ⋮ |

506 — RDE PERSONAL FMEA

| CAUSE | PRIMARY EFFECT | OCCURRENCE | MEASUREMENT | CORRECTIVE ACTION |
|---|---|---|---|---|
| BAD WIRING | SHORT CIRCUIT IN CELL | 1 | CHECK VOLTAGE OF BLUE WIRE | REPLACE WIRES |
|  | OPEN CIRCUIT | 2 | CHECK VOLTAGE | N/A |

METHOD, SYSTEM AND COMPUTER PRODUCT FOR PERFORMING FAILURE MODE AND EFFECTS ANALYSIS THROUGHOUT THE PRODUCT LIFE CYCLE

BACKGROUND OF INVENTION

The present disclosure relates generally to a method for distributed design and field service of a product and in particular to a method of developing and utilizing an electronic failure mode and effects analysis (FMEA) for performing design and field service of the product.

FMEA is a methodology for determining the root causes of defects in manufacturing processes and products. FMEA can be applied during the design phase of a product or process to identify potential fault modes or defects that may cause product or process failures. The FMEA methodology emphasizes defect prevention by examining all potential causes of a defect; the likelihood of these causes occurring and resulting in the defect, and ways of preventing these causes from occurring and resulting in the defect. The causes of defects in products may be defects in components that may be caused by sub-component defects. A typical FMEA includes a hierarchical list by component type of what happens to the overall product and the component when each part of the product fails. The hierarchy can include levels such as major division, system, sub-system, assembly, sub-assembly and part. The risk of potential fault modes are prioritized based on an estimated frequency of detection and severity. The probability of certain defects may be estimated by applying statistics to product or process histories. Otherwise, probabilities may be estimated based on experience.

Typically, in product or process design, an individual or a team is assigned to create a FMEA report or document. Team members can include representatives from disciplines such as engineering, purchasing, finance and field service. Performing FMEA can require that several experts assemble in one location for significant periods of time to generate the FMEA data. In a series of meetings, team members brainstorm to develop a list of potential defects, their effects (e.g., severity), and potential causes of the defects. In addition, the defects are prioritized according to an estimated risk. One or more of the team members take notes during the session. The work is often divided up among the team members to be performed outside the meeting. The work performed outside the meeting is then discussed and validated in the meetings. The team comes to consensus on whether each potential defect and the effects and causes of the defect are correct, and how much risk there is for each. After the meetings have concluded, the resulting consensus information is gathered into a FMEA report or document. A typical FMEA report can contain hundreds of entries. Utilizing a paper process for generating a FMEA report can make it difficult for the FMEA report to be disseminated, maintained and updated. The FMEA team can also document suggested corrections to prevent the defects or faults from occurring during customer use of the product or process. This data can be added to the FMEA report. In an extension of the process the data in the FMEA is augmented by corrective actions for each fault mode, and the resulting chart is called a failure mode effects and criticality analysis (FMECA).

SUMMARY OF INVENTION

One aspect of the invention is a method for performing failure mode and effects analysis throughout the product life cycle. The method comprises receiving incident data from a requester. The incident data includes a requestor product and a requestor fault mode. A shared failure mode and effects analysis database is accessed and searched for an existing entry that includes the incident data. The contents of the existing entry are transmitted to the requestor in response to locating an existing entry.

Another aspect of the invention is a system for performing failure mode and effects analysis throughout the product life cycle. The system comprises a network, a user system in communication with the network, a storage device including a shared failure mode and effects analysis database and a host system. The host system is in communication with the network and the storage device and the host system includes electronic collaboration software to implement a method comprising receiving incident data from a requestor on the user system. The incident data includes a requestor product and a requestor fault mode. The shared failure mode and effects analysis database is accessed and searched for an existing entry that includes the incident data. The contents of the existing entry are transmitted to the requestor on the user system in response to locating an existing entry.

A further aspect of the invention is a computer program product for performing field service of a product. The computer program product comprises a storage medium readable by a processing circuit and storing instructions for execution by the processing circuit for performing a method. The method comprises receiving incident data from a requestor. The incident data includes a requestor product and a requestor fault mode. A shared failure mode and effects analysis database is accessed and searched for an existing entry that includes the incident data. The contents of the existing entry are transmitted to the requestor in response to locating an existing entry.

Further aspects of the invention are disclosed herein. The above discussed and other features and advantages of the invention will be appreciated and understood by those skilled in the art from the following detailed description and drawings.

BRIEF DESCRIPTION OF DRAWINGS

Referring to the exemplary drawings wherein like elements are numbered alike in the several FIGURES:

FIG. 2 is an exemplary embodiment of a database layout for performing field service of a product;

FIG. 5 is an exemplary embodiment of a user interface for searching a FMEA database for a fault mode in a product.

DETAILED DESCRIPTION

One embodiment of the invention is a method for developing a FMEA database during the product design process, and for subsequently facilitating the field service of a product. In an exemplary embodiment, an electronic interface to a FMEA database is made available on a web-site, along with an on-line dialog that extracts information from the product experts (e.g., the original design engineers and experienced field engineers). The information from all the product experts is reconciled and provided for dissemination, review and subsequent updating of the FMEA database. The same web-site may contain access to search features that can be used to generate references and supporting documentation. In addition, a diagnostic capability is provided that allows end-users in the field (e.g., customers and remote diagnostic engineers) to search on effects, or symptoms, and results in the display of the associated corrective actions. New information provided by end-users in the field can be added to the FMEA database to track the product during field service. Product design team members do not need to be co-located and customers and field engineers do not need to meet or otherwise simultaneously access the system in order to identify diagnostic information. Additionally, the same system can be used to store product reliability information throughout the product life cycle, eliminating the need for multiple local copies of information and for servicing inconsistencies.

Figure 1:
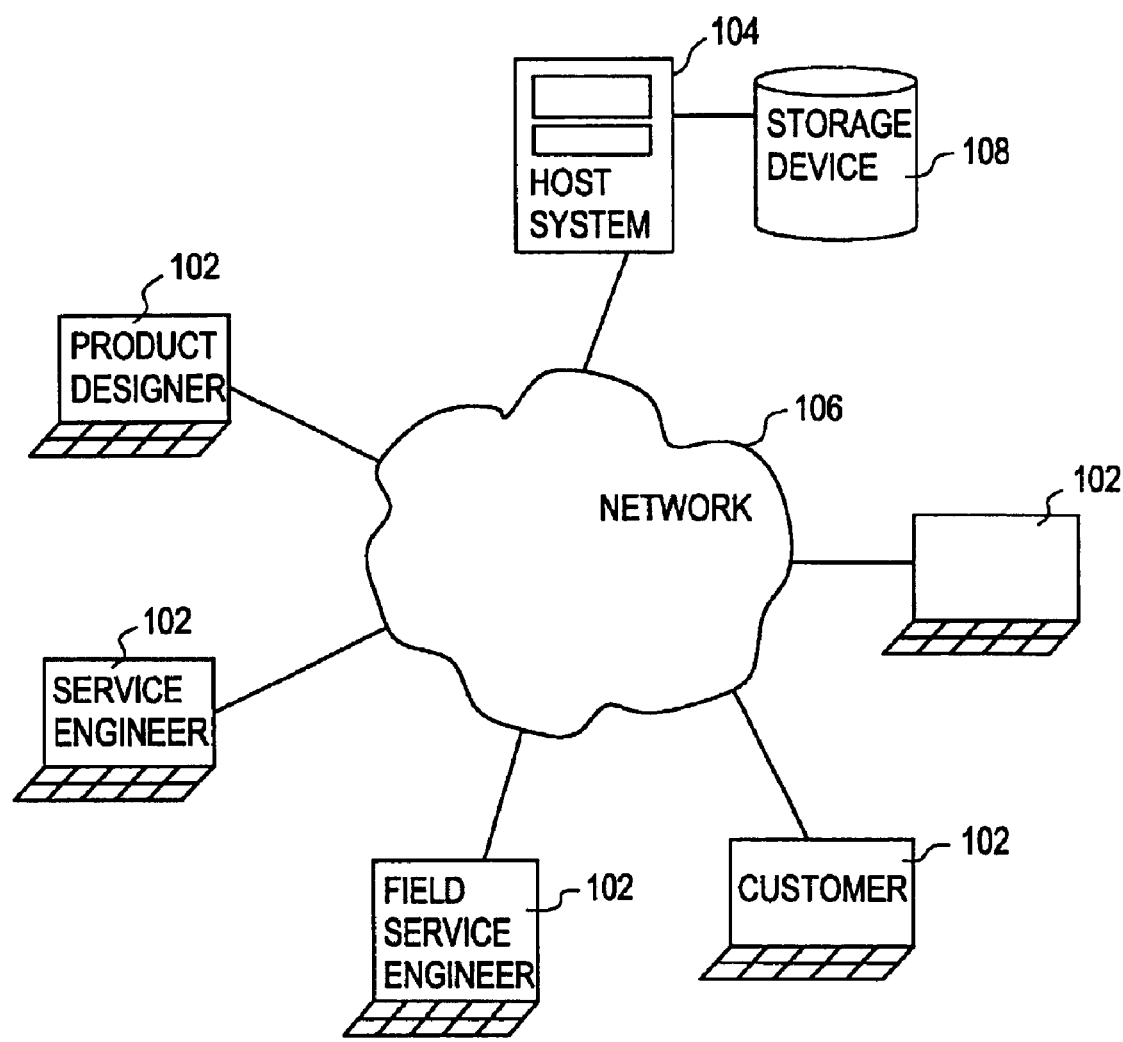
FIG. 1 is a block diagram of an exemplary system for performing field service of a product.

FIG. 1 is a block diagram of an exemplary system for performing field service of a product. The system of FIG. 1 includes user systems 102 through which an end-user can make a request to an application program on the host system 104 to access particular records stored on the storage device 108 in a FMEA database. Additionally, these requests for access to the FMEA database could come from a computer application running on the host system 104. In an exemplary embodiment, end-users can include product design team members or product experts located in a design or manufacturing site, a field service engineer located at a field office, an administrator, and a customer located at a customer location. The design team members can be physically located in one or more locations. In an exemplary embodiment, the host system 104 executes programs that provide access to one or more FMEA databases related to particular products. The user systems 102 can be directly connected to the host system 104 or they could be coupled to the host system 104 via the network 106. Each user system 102 may be implemented using a general-purpose computer executing a computer program for carrying out the processes described herein. The user systems 102 may be personal computers or host attached terminals. If the user systems 102 are personal computers, the processing described herein may be shared by a user system 102 and the host system 104 by providing an applet to the user system 102.

The network 106 may be any type of known network including a local area network (LAN), a wide area network (WAN), an intranet, or a global network (e.g., Internet). A user system 102 may be coupled to the host system 104 through multiple networks (e.g., intranet and Internet) so that not all user systems 102 are required to be coupled to the host system 104 through the same network. One or more of the user systems 102 and the host system 104 may be connected to the network 106 in a wireless fashion and the network 106 may be a wireless network. In an exemplary embodiment, the network 106 is the Internet and each user system 102 executes a user interface application to directly connect to the host system 104. In another embodiment, a user system 102 may execute a web browser to contact the host system 104 through the network 106. Alternatively, a user system 102 may be implemented using a device programmed primarily for accessing the network 106 such as WebTV.

The host system 104 may be implemented using a server operating in response to a computer program stored in a storage medium accessible by the server. The host system 104 may operate as a network server (often referred to as a web server) to communicate with the user systems 102. The host system 104 handles sending and receiving information to and from user systems 102 and can perform associated tasks. The host system 104 may also include a firewall to prevent unauthorized access to the host system 104 and enforce any limitations on authorized access. For instance, an administrator may have access to the entire system and have authority to modify portions of the system and a customer may only have access to view a subset of the FMEA database records for particular products. In an exemplary embodiment, the administrator has the ability to add new users, delete users and edit user privileges. The firewall may be implemented using conventional hardware and/or software as is known in the art.

The host system 104 also operates as an application server. The host system 104 executes one or more application programs to provide access to the FMEA database. Processing may be shared by the user system 102 and the host system 104 by providing an application (e.g., java applet) to the user system 102. Alternatively, the user system 102 can include a stand-alone software application for performing a portion of the processing described herein. It is understood that separate servers may be used to implement the network server functions and the application server functions. Alternatively, the network server, firewall and the application server can be implemented by a single server executing computer programs to perform the requisite functions.

The storage device 108 may be implemented using a variety of devices for storing electronic information such as a file transfer protocol (FTP) server. It is understood that the storage device 108 may be implemented using memory contained in the host system 104 or it may be a separate physical device. The storage device 108 contains a variety of information including a FMEA database that includes both a consensus FMEA database, and one or more end-user personal FMEA databases. The host system 104 may also operate as a database server and coordinate access to application data including data stored on the storage device 108. The consensus FMEA database and end-user personal FMEA databases can be physically stored as a single database with access restricted based on user characteristics or they can be physically stored in a variety of databases including portions of the database on the user systems 102 or the host system 104. In an exemplary embodiment, the FMEA database is implemented using a relational database system and the database system provides different views of the data to different users based on user characteristics. In an exemplary embodiment, the FMEA database is initially populated by entering the FMEA information as it is being developed by the product design team. In an alternate exemplary embodiment, the FMEA database is initially populated by importing data from an external system containing a consensus FMEA database created during the design process.

FIG. 2 is an exemplary embodiment of a layout of a FMEA database for supporting design and field service of a product. In an exemplary embodiment of the invention, the layout of the case records contained in the end-user personal FMEA databases are the same as the layout for the records contained in the consensus FMEA database. Database fields, using design terminology, are listed under the heading "Design Terminology" 244 in FIG. 2. The corresponding names of the fields, if they differ, in field service terminology are listed under the heading "Field Service Terminology" 246 in FIG. 2. In an exemplary embodiment of the invention, a single FMEA database is utilized for supporting both product design and field service. Referring to the database fields in FIG. 2, the field labeled product 202 is the top-level physical product of interest (e.g., computer monitor, rolling mill). The component 204 is a subset of the product 202 such as a subsystem, assembly, or part depending on the level of the hierarchy of parts. In an exemplary embodiment, fault mode 206 is an observable functional defect of the system. The fault mode 206 may include a fault code indication if the product has built-in fault detection. In field service terminology, the fault mode 206 corresponds to the customer complaint 234. The exemplary FMEA database layout depicted in FIG. 3 also includes cause 208 which is the root cause of the problem at the lowest level of detail that is of interest. The primary effect 210 and product level effect 212 relate to the consequences of the cause 208. The primary effect 210 is the consequence of the cause 208 at the lowest level of interest (e.g., component) and the product level effect 212 is the consequence of the cause 208 at the highest level of interest (e.g., system). In field service terminology, primary effect 210 corresponds to component symptom 236 and product level effect 212 corresponds to product level symptom 238.

The exemplary embodiment of a FEMA database layout depicted in FIG. 2 also includes a field for severity 214 data. Severity 214 is a severity rating, according to a quantitative measure, of the fault, if it occurs. It can be utilized as an indication of the seriousness of the defect. The occurrence 216 field in the FMEA database is the rate or likelihood of occurrence of the fault according to quantitative measures. Detectability 218 is the accuracy of the best available indicator of the fault or a physical measurement of the fault. Maintainability 220 is a measurement of the ability to fix the fault once it is detected. Data availability 222 is an index of the degree to which the fault is actually being measured (directly or indirectly). Notes 224 includes freeform text relating to the information contained in the database record. The measurement 226 field includes the best sensor used to measure the fault or the cause. Measurement 226 corresponds to trouble shooting procedure 240 in field service terminology. The corrective action 228 includes a repair procedure for the fault and, as depicted in FIG. 2, it corresponds to the repair procedure (or solution) 242 in field service terminology. The FMEA database field labeled date 230 contains the date that the record was updated. The FMEA database also includes a risk prioritization number (RPN) 232. Alternate embodiments of the FMEA database layout are possible depending on the specific FMEA data required and tracked by design and field service. In an exemplary embodiment, the same FMEA database fields are utilized for both product design and field service. In an alternate embodiment, the FMEA database fields developed during product design are augmented with database fields specific to field service.

Figure 3:
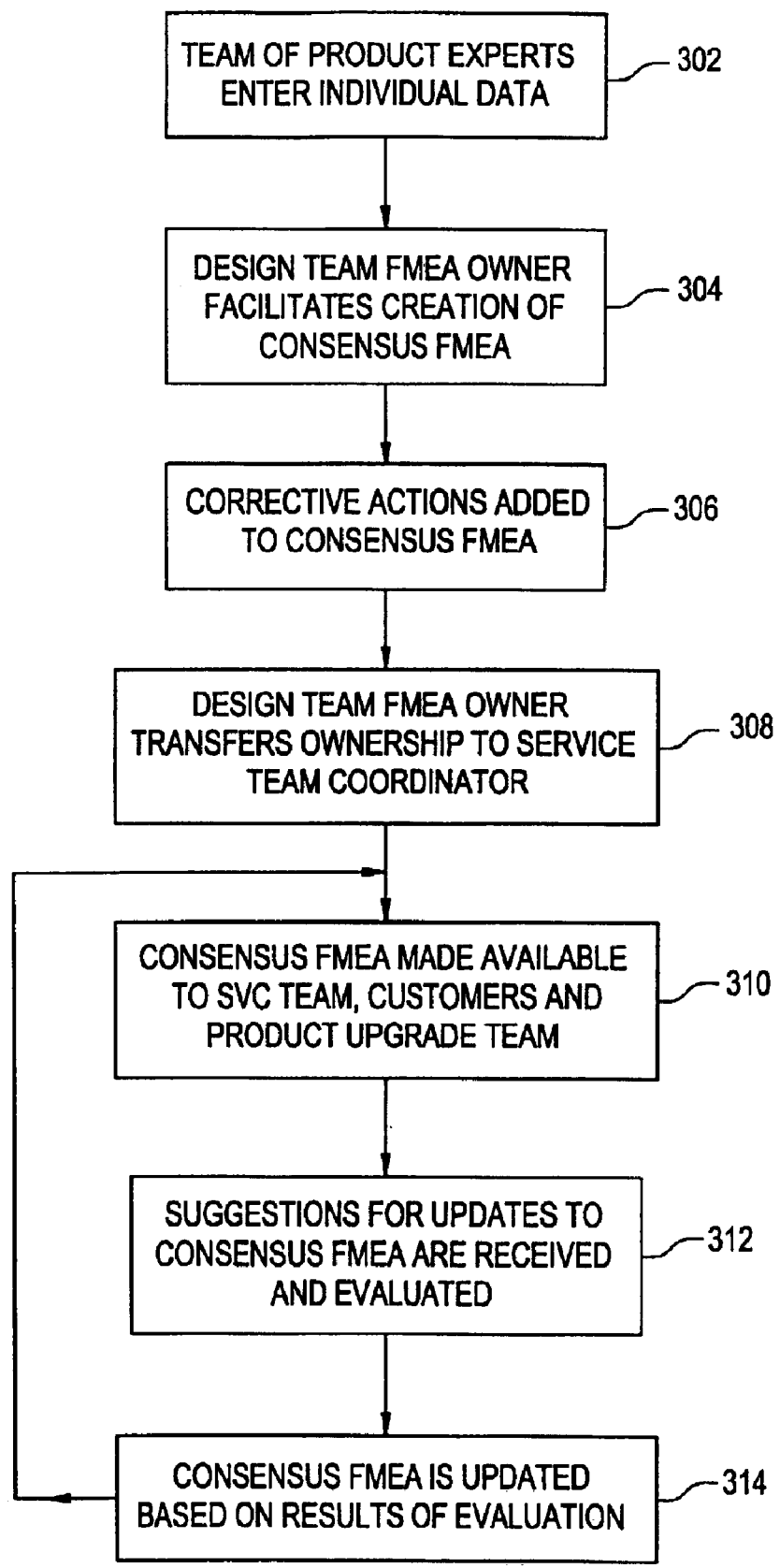
FIG. 3 is a block diagram of an exemplary embodiment of an overall process for utilizing a FMEA database during product design and field service.

FIG. 3 is a block diagram of an exemplary embodiment of an overall process for performing FMEA during product design and field service. The design team members may be located at more than one physical location and application software located on the host system 104 is utilized to perform the collaboration in order to create a consensus FMEA for the product. The design team members are logged on to user systems 102 that are connected, via the network 106, to the host system 104 that includes the FMEA collaboration application software as well as access to the FMEA database. Referring to step 302 in FIG. 3, each design team member, or product expert, independently identifies and enters into the computer a list of different fault modes 206 that could occur. The data can include potential fault modes 206, an associated severity 214 and a probability of occurrence 216. In an exemplary embodiment, the fault mode data is stored in a personal FMEA database associated with each design team member. At step 304, the FMEA owner facilitates the creation of a consensus FMEA. The head of the product design process can be assigned to be the FMEA owner. The FMEA owner can be charged with developing and maintaining the technical content of the FMEA. The FMEA owner can also serve as the moderator for the collaboration process by which individual experts merge their individual subsystem data inputs into an integrated consensus FMEA.

During the collaboration process at step 304, the FMEA owner can view what each design team member has entered as well as data included in the consensus FMEA database. The FMEA owner then suggests combining various lines of input from the design team members and leads a design team member discussion about the combination. In an exemplary embodiment, this discussion takes place electronically. Once consensus is reached, or the FMEA owner has made a decision in the event that consensus cannot be reached, the FMEA owner enters a new entry into the consensus FMEA database. At step 306 in FIG. 3, corrective actions 228 are designed for the highest RPN 232 items in the consensus FMEA. The RPN 232 can be a number derived by the system as the product of severity and occurrence indexes. For purposes such as the design of monitoring and measurement systems, an extended RPN 232, including product detectability and data availability index values can also be used. The corrective actions 228 are added to the consensus FMEA database. The corrective actions 228 can include improvement of design such as features built into the product or repair procedures. The corrective action 228 field in the consensus FMEA may be updated at a later time to make a design improvement or to suggest a manufacturing process corrective action 228.

At step 308 in FIG. 3, ownership of the consensus FMEA is transferred from the head of the design team to an individual with product service responsibility. This occurs once the design phase has been completed and the product enters routine use. At step 310, the consensus FMEA is made available to the service team, to customers and to the product upgrade team. At step 312, suggestions for updates to the consensus FMEA are received and evaluated. Suggestions for updates to the consensus FMEA can come from the service team, customers and the product upgrade team based on information that can include new fault modes 206, new trouble shooting procedures 240 and new repair procedures 242 that have been discovered. In addition, new component symptoms 236 and product level symptoms 238 may be the basis of a suggestion to update the consensus FMEA database for a particular product. In an exemplary embodiment, the suggestion to update the consensus FMEA is stored in a personal FMEA database and evaluated in a manner similar to the consensus process discussed in reference to step 304 but with the field service team. At step 314, the consensus FMEA database is updated based on the results of the evaluation. Processing then returns to step 310 with the updated consensus FMEA being made available to the service team, customers and the product upgrade team.

Figure 4:
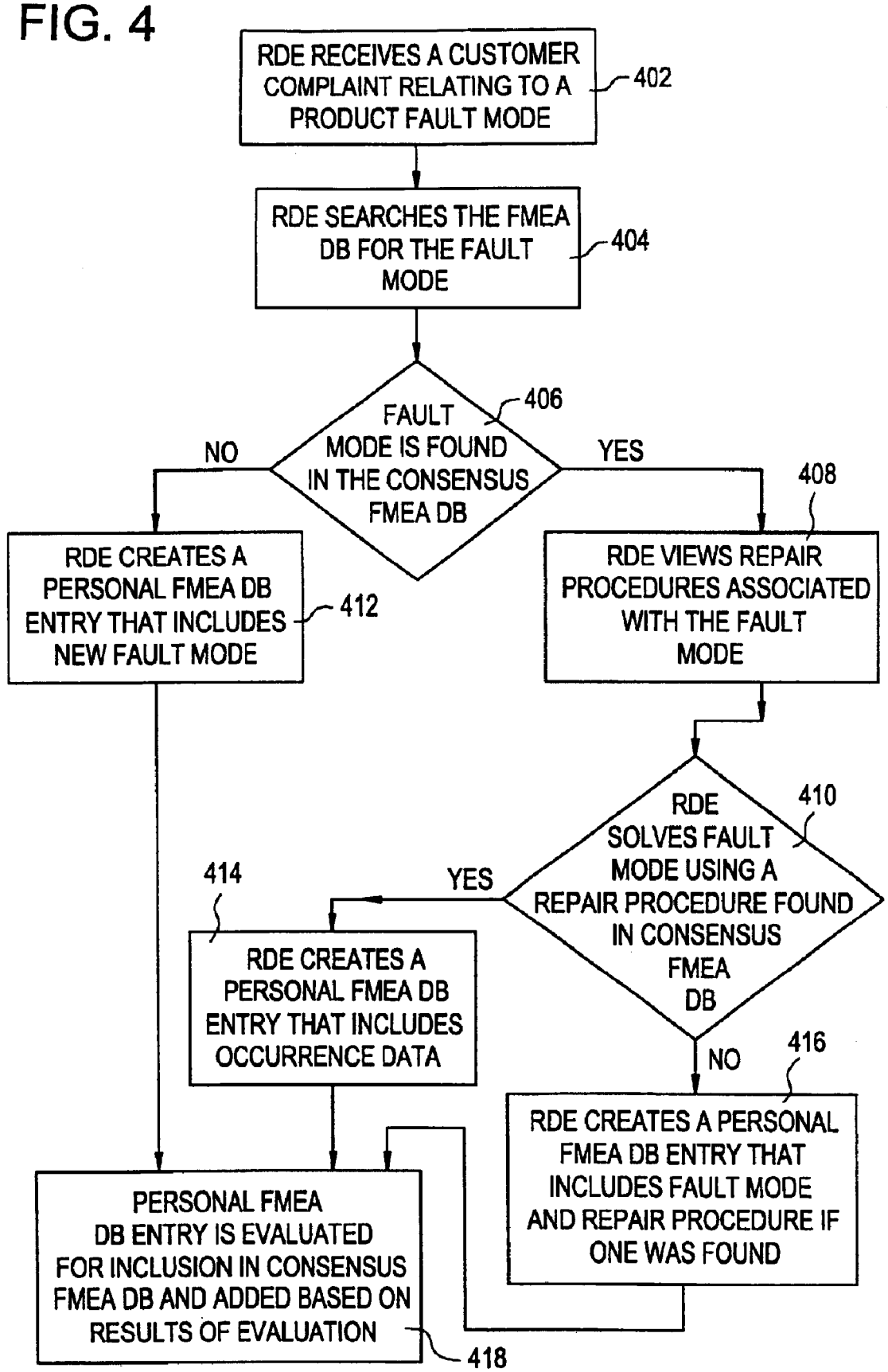
FIG. 4 is a block diagram of an exemplary embodiment of a process for performing field service of a product utilizing a FMEA database.

FIG. 4 is a block diagram of an exemplary embodiment of a process for performing field service of a product utilizing a FMEA database. The process begins at step 402 when a remote diagnostic engineer (RDE), or field service engineer, receives a customer complaint 234, or fault mode 206, relating to a product 202. Also included may be a component 204, component symptom 236 and/or a product level symptom 238. At step 404, the RDE searches the FMEA database for records relating to the product 202 and fault mode 206. The FMEA database includes the consensus FMEA database and a personal FMEA database associated with the RDE. At step 406 a check is made to see if the fault mode 206 associated with the product 202 was located in the consensus FMEA database. Step 412 is performed if the fault mode 206 was not located in the consensus FMEA database. At step 412, the RDE creates a personal FMEA database entry that includes the new fault mode 206 associated with the product 202 along with data that can include a trouble shooting procedure 240 and a repair procedure 242 if the RDE has solved the fault. Any other FMEA database fields as depicted in FIG. 2 can be included in the RDE personal FMEA database entry. Step 408 is performed if the fault mode 206 is located in the consensus FMEA database. At step 408 the RDE reviews the consensus FMEA database entry for possible trouble shooting procedures 240 (i.e., measurements 226) or repair procedures 242 (i.e., corrective actions 228) associated with the fault mode 206 and product 202. The RDE may access any of the fields associated with the FMEA database entry to aid in fault detection and correction.

At step 410, a check is made to determine if the RDE has corrected the fault mode 206 utilizing a repair procedure 242 located in the consensus FMEA database. If the RDE has utilized a repair procedure 242 found in the consensus FMEA database then step 414 is performed, and the RDE creates a personal FMEA database entry that includes occurrence 216 data. In an exemplary embodiment, occurrence 216 data is a counter that is incremented. The personal FMEA database entry can also include other information such as the date 230 and notes 224. Alternatively, step 416 is performed if the RDE did not utilize a repair procedure 242 found in the consensus FMEA database, as determined at step 410. At step 416, the RDE creates a personal FMEA database entry in order to document the actions the RDE performed to respond to the fault mode 206. The personal FMEA database entry can include any of the fields included in the consensus FMEA database layout, including data such as the repair procedure 242 that corrected the fault mode 206, fault occurrence 216 rate update and product level symptoms 238 observed. At step 418, the personal FMEA database entry is evaluated for inclusion in the consensus FMEA. If it is determined that that personal FMEA database entry should be included in the consensus FMEA (e.g., personal FMEA database entry includes a common fault mode 206) then it is added to the consensus FMEA. In an exemplary embodiment, the consensus FMEA owner utilizes the same collaboration process and data discussed previously to get input from other team members on what entries should be included in the consensus FMEA. In this manner, the consensus FMEA is augmented with field service data.

In an alternate exemplary embodiment, the process depicted in FIG. 4 can be performed by a customer, through the network 106 using a user system 102, by giving the customer access to portions of the consensus FMEA database for a particular set of products. The portions of the consensus FMEA database that the customer could access can include fault mode 206 records that have been approved for customer access or all fault mode 206 records relating to a particular product 202 that the customer has purchased. In an alternate embodiment, a customer is directed to a particular consensus FMEA entry by a RDE. The customer may report a new problem by generating a customer FMEA entry to record the occurrence of a new type of fault 242. Then, step 418 would be performed, as described above, in order to determine if the customer personal FMEA entry should be included in the consensus FMEA. In another exemplary embodiment, the product upgrade team utilizes the consensus FMEA to design product improvements for the next upgrade of the product. In this manner field service data can be utilized to improve future upgrades of the product.

FIG. 5 is an exemplary embodiment of a user interface for searching a FMEA database for a fault mode associated with a product 202. As depicted in the user entry box 502 at the top of FIG. 5, the RDE can enter the product 202, the fault mode 206 and the product level symptom 238. Any fields contained in the consensus FMEA database can be used as search terms for the RDE to locate FMEA entries relating to a customer complaint 234 and the fields depicted in box 502 are for example purposes only. In response to the data input into the user entry box 502, two types of FMEA database entries are displayed. The consensus FMEA database entries 504 that match the search criteria are displayed along with the RDE personal FMEA database entries 506 that match the search criteria. Any fields contained in the FMEA database entries can be displayed and used as search fields, and the sort order can be adjusted based on user preference. For example, the FMEA entries can be sorted by date 230, by increasing RPN 232 and by decreasing RPN 232 in order to facilitate easier design or servicing. Additionally, a "fishbone" diagram may be automatically generated from the FMEA in order to assist in root cause analysis. Other output modes are possible, including the ability to export a snapshot of a segment of the FMEA in spreadsheet format that can be utilized by users that are not remotely connected to the FMEA database.

An embodiment of the invention provides for a decentralized user base that can collaborate electronically to update and utilize a consensus FMEA database from product design through product field service. This can result in reduced time and level of effort required for generating a FMEA database because product experts can be located in multiple physical locations during meetings to develop the FMEA database. In addition, an embodiment of the invention utilizes a single consensus FMEA database for the product design, field service and product upgrade stages of the product life cycle. This can result in a reduction in time to solve field service problems because the individuals performing field support can easily view input from the design team and other field service personnel in order, to determine what type of service actions should be performed. Also, the use of a single consensus FMEA database can result in a more consistent quality of service because all field service personnel will have access to the same information. An embodiment of the invention also allows each user to keep a personal FMEA database or entries. This can result in improved local field service because a RDE can record field service data for particular customers even if the FMEA owner has determined that the data does not belong in the consensus FMEA. An embodiment of the invention also allows customers access to the consensus FMEA database either directly through entering search terms or through a direction from a RDE to view a particular entry. This can result in more rapid service for a customer and the ability for the product provider to provide a high level of support with fewer resources. An embodiment of the invention can be applied to a process (e.g., a customer service process) with each process broken down into steps and sub-steps. This can result in improved customer service due to an improvement in the process. An embodiment of the present invention can be utilized for any type of product including products such as industrial power distribution equipment, a turbine engine system (aircraft or power generation) and appliances.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for performing failure mode and effects analysis throughout the product life cycle, the method comprising:

receiving incident data from a requestor, said incident data including a requestor product and a requester fault mode;

receiving field solution data from said requestor, said field solution data including said requestor product, said requestor fault mode, a requestor corrective action and a requestor primary effect;

accessing a shared failure mode and effects analysis database;

searching said database for an existing entry that includes said incident data; and transmitting the contents of said existing entry to said requestor in response to locating said existing entry.

2. The method of claim 1, wherein said field solution data further includes a requester component.

3. The method of claim 1, wherein said field solution data further includes a requester measurement.

4. The method of claim 1 wherein said field solution data further includes a requester measurement.

5. The method of claim 1, further comprising evaluating said field solution data for inclusion in said database.

6. The method of claim 5, wherein said evaluating includes a plurality of team members viewing said field solution data and collaborating electronically.

7. The method of claim 5, further comprising:

augmenting said database in response to said receiving field solution data and to said evaluating, wherein said augmenting includes:

searching said database for an existing entry that includes said field solution data; and updating an occurrence field corresponding to said existing entry in response to locating said existing entry in said database; or inserting a new entry into said database in response to an indication that said field solution data was not located in said database, wherein said new entry includes said field solution data.

8. The method of claim 7, wherein said occurrence field includes a counter and said updating an occurrence field includes incrementing said counter.

9. The method of claim 1, wherein said database is imported from an external system containing failure mode and effects analysis data.

10. The method of claim 1, further including creating said database during product design.

11. The method of claim 10, wherein said creating includes:

performing failure mode and effects analysis; and populating said database in response to said performing.

12. The method of claim 11, wherein said performing failure mode and effects analysis includes utilizing a collaboration tool to reach consensus on said populating.

13. The method of claim 1, wherein said requestor is a customer.

14. The method of claim 1, wherein said requestor is a remote diagnostics engineer.

15. The method of claim 1, wherein said incident data further includes a requestor component.

16. The method of claim 1, wherein said incident data further includes a requestor primary effect.

17. The method of claim 1, wherein said incident data further includes a requestor product level effect.

18. The method of claim 1, wherein said database includes a product field, a fault mode field, a corrective action field and an occurrence field.

19. The method of claim 18, wherein said database further includes a component field.

20. The method of claim 18, wherein said database further includes a primary effect field.

21. The method of claim 18, wherein said database further includes a product level effect field.

22. The method of claim 18, wherein said database further includes a measurement field.

23. The method of claim 1, wherein said product is industrial power distribution equipment.

24. The method of claim 1, wherein said product is a turbine engine system.

25. The method of claim 1, wherein said product is an appliance.

26. A system for performing failure mode and effects analysis throughout the product life cycle, the system comprising:

a network;

a user system in communication with said network;

a storage device including a shared failure mode and effects analysis database; and a host system in communication with said network and said storage device, said host system including electronic collaboration software to implement a method comprising:

receiving incident data from a requestor on said user system, said incident data including a requester product and a requester fault mode;

accessing said database;

searching said database for an existing entry that includes said incident data; and transmitting the contents of said existing entry to said requestor on said user system in response to locating said existing entry.

27. The system of claim 26, wherein said electronic collaboration software includes instructions to implement a method further comprising:

receiving field solution data from said requester, said field solution data including said requestor product, said requestor fault mode and a requestor corrective action.

28. The system of claim 27, wherein said electronic collaboration software includes instructions to implement a method further comprising:

evaluating said field solution data for inclusion in said database.

29. The system of claim 28, wherein said electronic collaboration software includes instructions to implement a method further comprising:

augmenting said database in response to said receiving field solution data and to said evaluating, wherein said augmenting includes:

searching said database for an existing entry that includes said field solution data; and updating an occurrence field corresponding to said existing entry in response to locating said existing entry in said database; or inserting a new entry into said database in response to an indication that said field solution data was not located in said database, wherein said new entry includes said field solution data.

30. The system of claim 26, wherein said electronic collaboration software includes instructions to implement a method further comprising:

performing failure mode and effects analysis; and populating said database in response to said performing.

31. The system of claim 26, wherein said network is the Internet.

32. The system of claim 26, wherein said network is an intranet.

33. The system of claim 26, wherein said storage device and said host system are located in different geographic locations and communicate via said network.

34. The system of claim 26, wherein said user system and said host system are located in different geographic locations.

35. A computer program product for performing failure mode and effects analysis throughout the product life cycle, the computer product comprising:

a storage medium readable by a processing circuit and storing instructions for execution by the processing circuit for performing a method comprising:

receiving field solution data from said requestor, said field solution data including said requestor product, said requestor fault mode, a requester corrective action and a requestor primary effect;

receiving incident data from a requester, said incident data including a requestor product and a requestor fault mode;

accessing a shared failure mode and effects analysis database;

searching said database for an existing entry that includes said incident data; and transmitting the contents of said existing entry to said requestor in response to locating said existing entry.

36. A method for performing failure mode and effects analysis throughout the product life cycle, the method comprising:

receiving incident data from a requestor, said incident data including a requestor product and a requestor fault mode;

accessing a shared failure mode and effects analysis database;

searching said database for an existing entry that includes said incident data; and transmitting the contents of said existing entry to said requester in response to locating said existing entry;

wherein said product is industrial power distribution equipment.

37. A method for performing failure mode and effects analysis throughout the product life cycle, the method comprising:

receiving incident data from a requester, said incident data including a requester product and a requestor fault mode;

accessing a shared failure mode and effects analysis database;

searching said database for an existing entry that includes said incident data; and transmitting the contents of said existing entry to said requestor in response to locating said existing entry;

wherein said product is a turbine engine system.

* * * * *

UNITED STATES PATENT AND TRADEMARK OFFICE
CERTIFICATE OF CORRECTION

PATENT NO.        : 6,909,994 B2                                        Page 1 of 1
APPLICATION NO. : 10/303163
DATED             : June 21, 2005
INVENTOR(S)       : Timothy Lee Johnson, Paul Edward Cuddihy and Steven Hector Azzaro It is certified that error appears in the above-identified patent and that said Letters Patent is hereby corrected as shown below:

There are repetitive spelling errors in claims 1-4, 26, 27, and 35-37. Where indicated, please replace the word "requester" with --requestor--:

Column 9, line 44
Column 9, line 58
Column 9, line 60
Column 9, line 62
Column 11, line 2
Column 11, line 3
Column 11, line 13
Column 12, line 9
Column 12, line 11
Column 12, line 34
Column 12, line 40
Column 12, line 41

Signed and Sealed this

Eleventh Day of August, 2009

David J. Kappos
*Director of the United States Patent and Trademark Office*